INVENTOR.
Lewis L. Bognar
By Clarence R. Catty
ATTORNEY

March 15, 1966 L. L. BOGNAR 3,240,090
METHOD AND APPARATUS FOR SCORING SHEET MATERIAL
Filed March 17, 1964 5 Sheets-Sheet 2
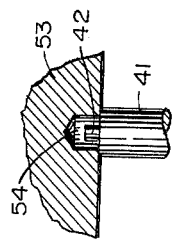
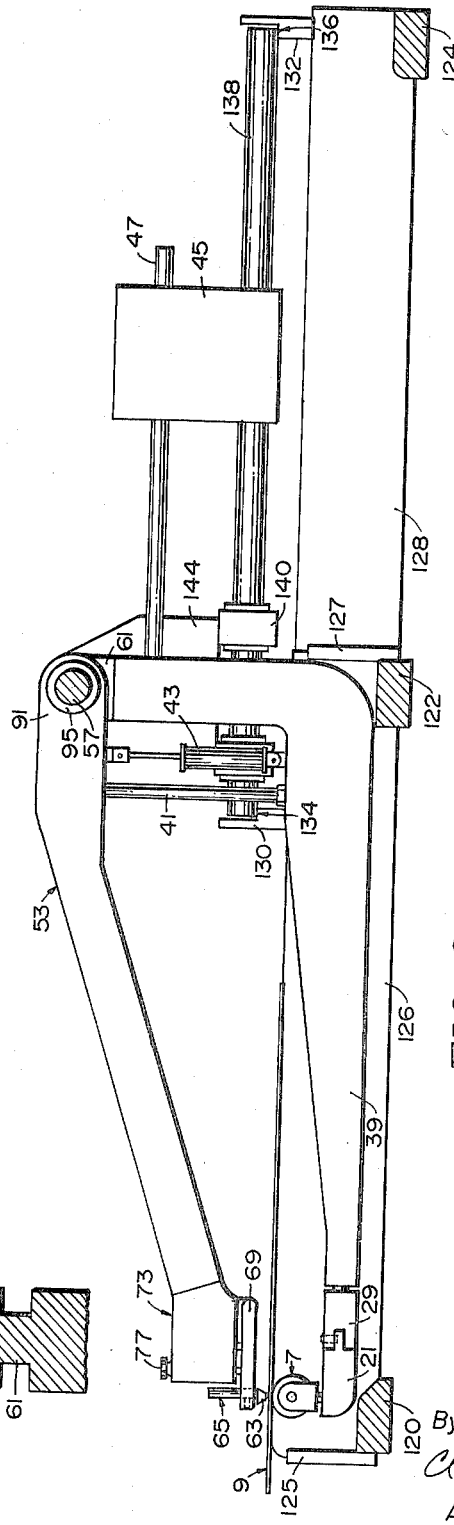
INVENTOR.
Lewis L. Bognar
By
ATTORNEY March 15, 1966 L. L. BOGNAR 3,240,090
METHOD AND APPARATUS FOR SCORING SHEET MATERIAL
Filed March 17, 1964 5 Sheets-Sheet 3

INVENTOR.
Lewis L. Bognar
BY
ATTORNEY

March 15, 1966

L. L. BOGNAR 3,240,090

METHOD AND APPARATUS FOR SCORING SHEET MATERIAL

Filed March 17, 1964

INVENTOR.
Lewis L. Bognar
By *Clarence R Patty*
ATTORNEY

March 15, 1966  L. L. BOGNAR  3,240,090
METHOD AND APPARATUS FOR SCORING SHEET MATERIAL
Filed March 17, 1964  5 Sheets-Sheet 5

INVENTOR.
Lewis L. Bognar
BY
ATTORNEY

United States Patent Office 3,240,090
Patented Mar. 15, 1966

3,240,090
METHOD AND APPARATUS FOR SCORING SHEET MATERIAL
Lewis L. Bognar, Painted Post, N.Y., assignor to Corning Glass Works, Corning, N.Y., a corporation of New York
Filed Mar. 17, 1964, Ser. No. 352,542
10 Claims. (Cl. 83—7)

This invention relates to a new and improved method and apparatus for scoring sheet material. More particularly, it relates to a device for scoring microsheet glass whereby a contour in the glass is traversed without causing a change in cutting or scoring force.

Normally, sheet glass material is scored manually with a hand tool, such as a glass cutting wheel. The sheet glass material, in most cases, is presented to a laborer for scoring without any heat treatment or controlled cooling in a lehr. Resulting sheet configurations evidenced warped glass contours and edge beads; both defects cause internal stresses and propagate cracks when scoring is attempted.

Sheet glass, in thicknesses of less than ¼ inch, is transferred directly from a forming machine to a laborer for manual cutting. Without the use of a soaking lehr, the glass cools at an uncontrolled rate and contains induced stresses. Bead defects occur at the two outside edges of glass sheeting and give the glass a bone-shaped appearance when viewed in profile. This gathering of material at the outside edges causes lines of internal stress to be set up across the width of the glass on cooling. In the plane of the sheet glass, warping, such as deformation by twisting, turning or bending from the normal surface, occurs. These defects deleteriously influence glass contour and sheet configuration.

Presently sheets being scored are supported on a flat table and subjected to damage by scuffing and scraping. A template, such as a grid consisting of parallel bars with rectangular cross section is brought down on the upper surface of the glass. The sheet is in a virgin condition, and is bent by the template to conform to the table surface. By pressing the defects flat, internal stresses are set up or intensified in the sheet. Scoring is done manually so that only one score can be made at a time. Scoring proceeds normally on unstressed glass, however, once the glass-cutting wheel nicks a glass portion subjected to internal stresses, the sheet cracks along a line coincident with a major stress line in the sheet.

Physical force supplied manually is not consistent so that the impression of any one score line may vary greatly in depth from location to location along its length. If the force becomes too large, penetration by the cutting wheel causes spallation. That is, chips or splinters exfoliate and adhere forming dust specks which are arduous to remove and cause problems in subsequent operations. The chips interfere with vision through microscope slides and occasion humps in subsequently deposited metallic films.

My invention not only alleviates the problem of glass loss due to introduced stress configurations but also provides a multiple scoring device which follows the surface configurations of sheet glass without causing a change in the scoring force. Adjustments in a cutting head prolong scoring tool life and provide a constant pressure on the glass through the entire cutting process. Much waste has been eliminated and a more economical cutting method resulted.

It has thus been an object of my invention to provide a method of scoring sheet glass material without subjecting the material to surface damage from scuffing and scraping.

A further object of my invention is to eliminate induced internal stress configurations in sheet glass while being scored.

A further object of my invention is to simultaneously produce multiple score lines in a glass surface.

A further object of my invention is to reap better selection with greater usable product and less scrap material.

A further object of my invention is to provide an apparatus to follow the glass contour and sheet configuration while scoring the glass surface.

A further object of my invention is to provide an apparatus to score a sheet glass surface without any change in cutting or scoring force thereby eliminating defects due to chips and spalls.

A further object of my invention is to increase accuracy in part sizes by removing the glass cutting wheel from the hands of an operator.

A further object of my invention is to provide increased cutting tool life by constant pressure on the glass during entire cutting process.

A further object of my invention is to provide continual, multiple scoring of sheet material.

Other objects and advantages of my invention will be shown in the following detailed description of preferred embodiments thereof as illustrated in the accompanying drawings in which:

FIG. 2 is an elevational view taken along line 2—2 of FIG. 1 showing one form of the device with a glass cutting wheel attached to a top arm end, an adjustable counterbalance attached to a lower arm and an air cylinder in an internal position.

FIG. 3 is a fragmentary, sectional view of a finder tip on an adjusting rod portion occupying a depression in the top arm.

FIG. 4 is a fragmentary sectional view of tongue and bifurcated portion assembled on main shaft support.

Figure 5:
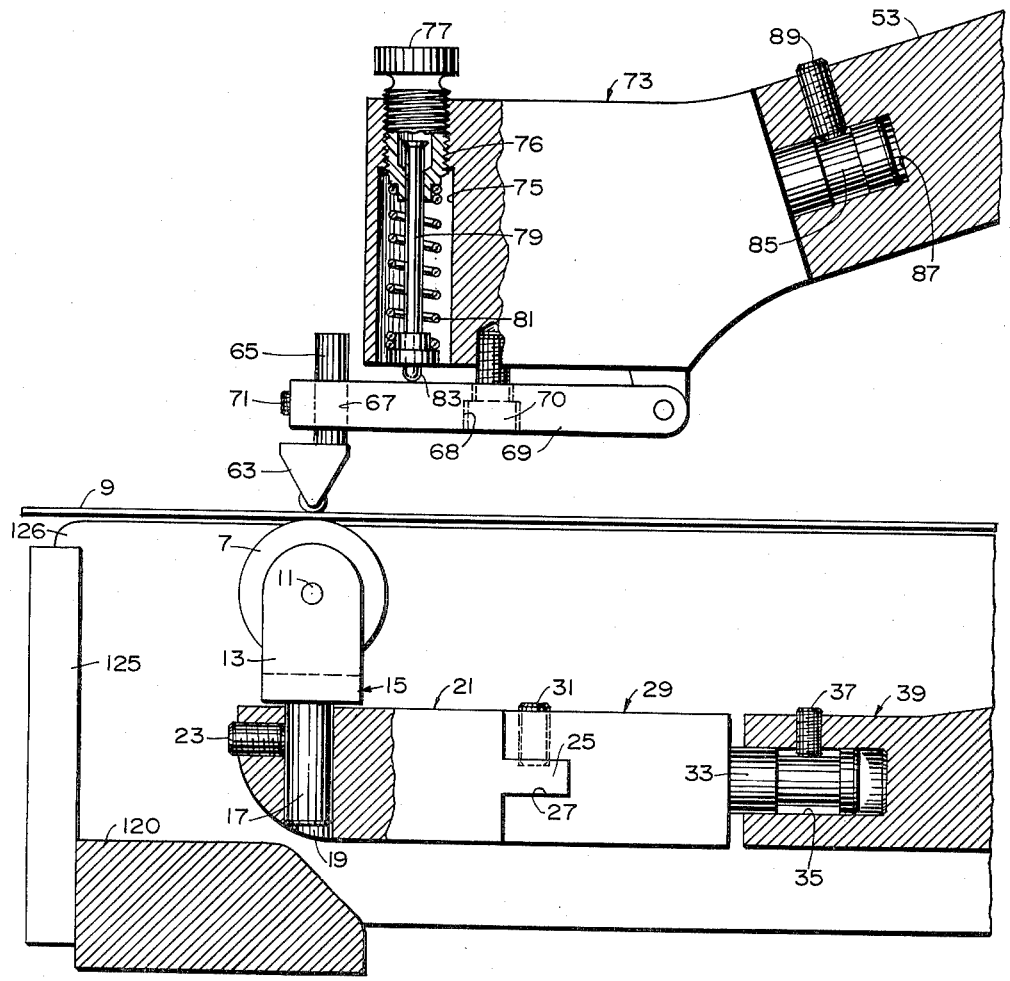
FIG. 5 is an enlarged elevational view, partially in section, illustrating adjustable top and lower arms.

Referring now to the drawings and particularly FIGURE 5, a suitable anvil such as a roller portion 7 provides at its uppermost point lineal support for a sheet of material 9, such as microsheet glass, which is to be cut or scored. While this invention is directed to microsheet material, it is not limited to thin sheets but can score plate material. A wheel shaft 11 through the roller portion 7 allows the roller to turn. A bifurcated yoke portion 13 of a wheel support 15 carries the wheel shaft 11. A shaft portion 17 of wheel support 15 enters a bore 19 in a lower arm end adjustment portion 21 and maintains the wheel support 15 in a generally upright position. The wheel support is mounted to adjust vertically and rotationally within the bore 19; a set screw 23 in lower arm end adjustment 21 engages the shaft portion 17 of wheel support 15 and maintains an adjusted positionment. This multiple omni-directional adjustment allows lineal point support by the roller regardless of relative direction in which the material may be traveling. While a preferred embodiment uses a roller portion to provide at its uppermost point lineal support, an anvil or skid could provide similar support.

A tongue portion 25 of the lower arm end adjustment portion 21 occupies a slot 27 in lower arm correctment or adjustment section 29. Adjustable, horizontal movements result from this occupancy and remain fixed under influence of a set screw 31. Lateral and rotational regulation of the lower arm correctment section 29 results from a graduated plug portion 33 residing in cavity portion 35 of lower arm 39. A set screw 37 in bottom arm 39 engages the graduated plug portion 33 of lower arm correctment section 29 and maintains the lower arm correctment in a desired position.

An adjusting rod portion 41 (FIG. 2) extends vertically upward from the upper, inner surface of the generally L-shaped lower arm 39 to control the spacing between the lower arm and an upper arm 53. The adjusting rod portion is preset to limit the distance between the upper arm and lower arm to accommodate the thickness of the material being scored. A finder tip 42 (FIG. 3) on the upper end of adjusting rod 41 enters a depression 54 in the lower surface of top arm 53 to aid the proper positionment and relationship of the upper and lower arms.

Figure 6:
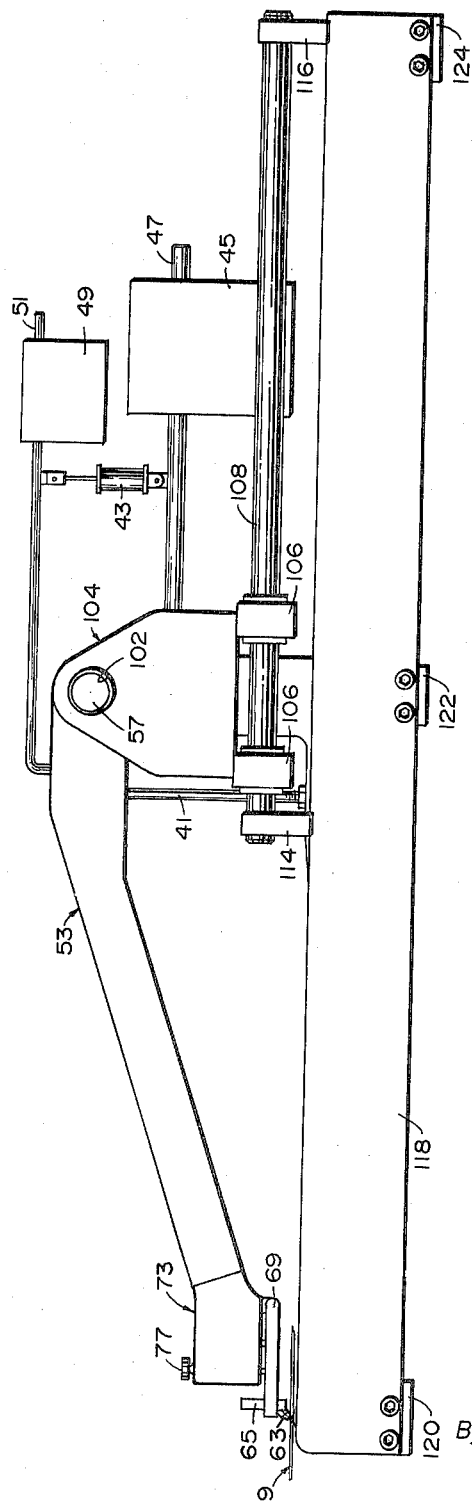
FIG. 6 is a side elevational view from the fixed shaft side, illustrating another form of a device for scoring sheet glass in which a top arm end is shown provided with a diamond cutting tool; and, an adjustable counterbalance system and air cylinder are shown exteriorly mounted.

In FIG. 2 an adjustable cylinder portion 43 is shown attached to and extending between the upper and lower arms. Although operable in such position, my preferred positioning of the air cylinder is shown in FIGURE 6 wherein the cylinder is mounted outside the arms such that more reaction and sensitivity result from less input air pressure.

An adjustable counterweight 45 is mounted on a lower arm counterweight rod 47, which in turn extends from the lower arm. Another embodiment shown in FIGURE 6 illustrates an adjustable counterweight 49 mounted on an upper arm counterweight rod 51 which extends from the upper arm 53. The number and location of the counterweights is not critical to the invention, as long as they substantially balance the arms 39, 53 in their operating position. Counterbalancing keeps the weight of the arms and their respective appurtenances off the material being scored and therefore induces no stress into the sheet.

Balance aids the system to pivot properly and to reduce the size of the adjustable cylinder used for relatively opening and closing the arms. The system may be balanced as in FIGURE 6 with counterweights on top arm and bottom arm, or with a weight on the bottom arm (FIG. 2) or a weight on the top arm.

The lower arm is pivotally mounted on an arm sleeve bearing 55 (FIG. 4) which surrounds a main shaft support 57. The united support and bearing extend through a bore 59 in tongue 61 located on the outer end of the shorter leg of the L-shaped lower arm.

A scoring means 63, such as a diamond point shown in FIGURE 6 or a glass scoring wheel shown in FIGURE 5 is mounted so that a scoring means force is axially directed to coincide with a point support force situated on the lineal support provided by the roller portion 7. Thus, an axial alignment is provided between the point support and the scoring means. The scoring means force and the point support force are perpendicular to the surfaces of the material being scored. No torque is produced because the forces lie along the axial alignment. The scoring means would also include a resistance wire scoring device within its definition.

A shaft portion 65 (FIG. 5) extending from the scoring means penetrates a bore 67 in the anterior end of a scoring means pivot arm 69. Adjustable vertical and rotational movements of the scoring means 63 result from this occupancy and remain fixed under the influence of a set screw 71.

The scoring means arm 69 pivots on a top arm end portion 73. A vertical bore 75 passes through the anterior end of the top arm end portion 73. A threaded scoring wheel adjusting screw 77 engages a threaded portion 76 on the upper end of the vertical bore 75. A spring guide 79 attaches to the base of adjusting screw 77 and maintains and retains a spring 81 within the confines of bore 75. By manipulation of flexibly positionable screw 77, a force portion 83 to the lower end of scoring guide 79 exerts a force on the upper surface of the scoring means pivot arm 69. This force transfers to the scoring means and the material is scored. It should be noted that the force is not a part of the force of the air cylinder which relatively opens and closes the arms and allows new material to be inserted. The adjustment of the adjusting screw force, provides constant exertion on the cutting means and reduces chipping and spalling. Retaining bolt 70, positioned within a cavity 68 in lower surface of arm 69 and retained in a lower portion of top arm end portion 73 prevents pivoting due to pressure of spring 81 when scoring means is not contacting glass surface.

An adapter shaft portion 85 extending from the top arm end portion 73 engages a bore 87 in the outer end of the upper arm 53. The top arm end portion 73 may be adjusted laterally and rotationally by means of shaft portion 85 positioned within bore 87, and a set screw 89 in the upper arm locks the adapter shaft 85 in a desired position. By combined use of these available adjustments, the scoring means is omni-directionally positionable.

The upper arm 53, like the lower arm 39, pivots on the main shaft support 57. A bifurcated portion 91 (FIGS. 1 and 4) on the upper end of the upper arm, penetrated by a bore 93, relatively engages the tongue 61 of the lower arm. The main shaft support 57 and arms sleeve bearing 55 extend through the coincident bores of the unitized and assembled tongue 61 and bifurcated portion 91. Now the upper arm and lower arm, with their respective appurtenances, pivot around the main shaft support.

Figure 1:
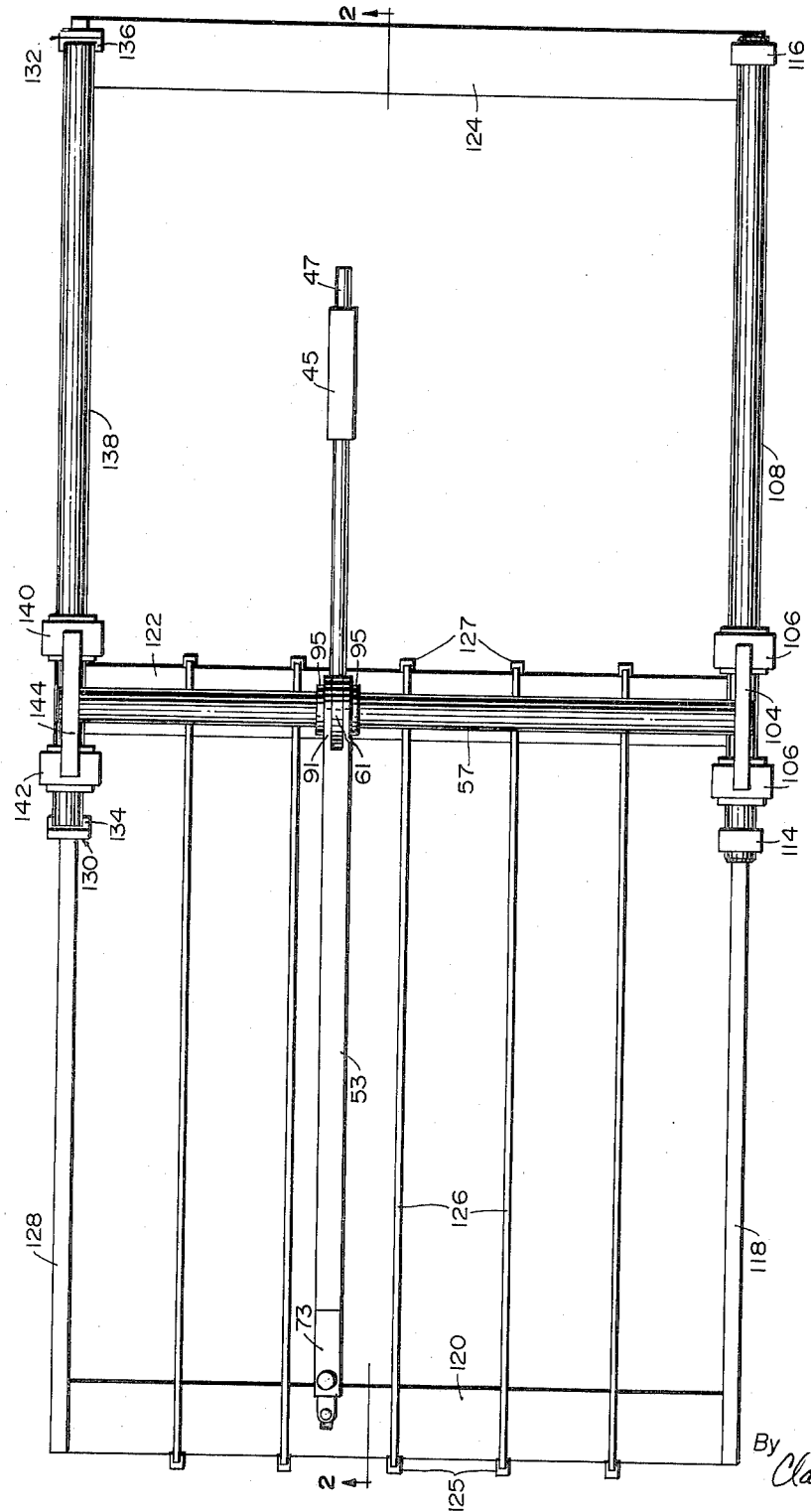
FIG. 1 is a top plan view of a scoring device illustrating a fixed shaft portion and a floating shaft portion.
Figure 7:
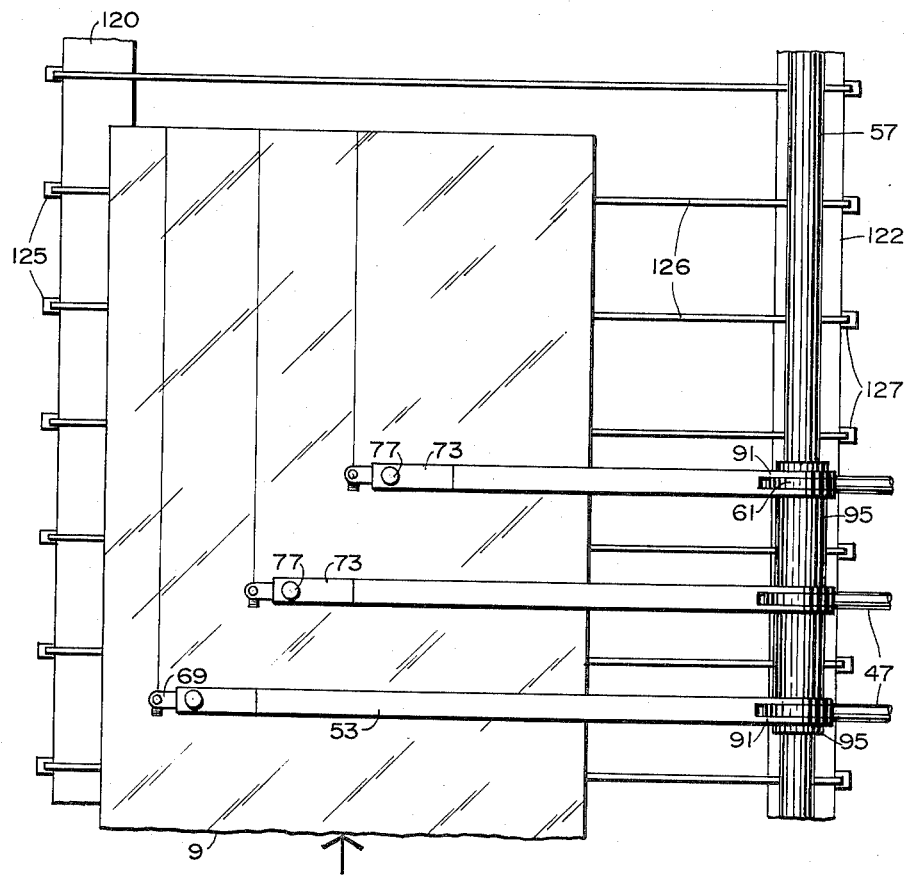
FIG. 7 is a top plan view of a modification of the device illustrating side mounting of the cutting means for continuous surface scoring.

The number of arm assemblies which may be used to practice this invention is limited by the length of main shaft support 57 which accommodates such assemblies. A collar 95 surrounds the shaft and separates one pair or assembly of arms from an adjacent pair of arms as shown in FIGURE 7, or is mounted on the shaft 57 adjacent the outer sides of a pair or assembly of arms to prevent lateral movement along the main shaft support, as shown in FIGURES 1 and 7. The collars 95 are retained in place by a suitable means.

The main support shaft 57 pentrates a bore 102 through an upper triangular portion of support bracket 104 (FIG. 6). Two ball bushings 106 are attached to a lower portion of support bracket 104 to provide motion along a fixed shaft 108. The ends of the fixed shaft 108 are supported by vertical keeper portions 114 and 116.

The vertical keeper portions are mounted on the upper surface of the generally rectangular fixed track portion 118. Fore and aft motion of the bracket 104 on the fixed shaft is restricted to a path determined by the end-position keeper portions 114 and 116.

A fore bottom support bar 120 (FIG. 1), a middle bottom support bar 122, and an aft bottom support bar 124 of generally rectangular shape attach to the fixed track portion 118 at right angles, form a base and provide rigidity for the device.

Attached to the middle support bar 122 and the fore support bar 120 and parallel to fixed track portion 118 are rectangular baffles 126 with baffle supports 125 and 127 at their ends as shown in FIGURES 1 and 5. The baffles support the sheet material prior to scoring the material.

A track 128 attaches at right angles to the posterior ends of support bars 120, 122 and 124 as shown in FIGURE 1. Vertical L-shaped support portions 130 and 132 (FIG. 2) are mounted on the upper surface of the generally rectangular track portion 128. The L-shaped support portions 130 and 132 are oppositely disposed and have platforms 134 and 136 in open communication with each other, which respectively vertically support the ends of a floating shaft portion 138. The platforms allow floating shaft 138 lateral motion and vertically upward motion but prevent downward motion. Supporting the device in this method gives accuracy accompanied by flexibility as the material is scored. The accuracy is provided by the restricted path determined by end positioned keeper portions 114 and 116.

The floating shaft portion carries ball bushings 140 and 142 which are attached to a lower portion of support bracket 144. The main support shaft 57 extends from an upper triangular portion of support bracket 144. Thus, the main support shaft 57 is suspended between support bracket 144 and support bracket 104.

Thus, in carrying out my inventive concept, a roller is mounted so as to be omni-directionally adjustable and is positioned to provide at its uppermost point lineal support to sheet material being scored; and a scoring means is mounted to be omni-directionally adjustable and is situated to score the sheet material in an axial alignment, such as directly vertical, with the point support afforded by the roller.

The roller and scoring means are relatively opened and closed by an air cylinder. A scoring force is provided by adjusting mechanism such as 77 in top arm end 73. This scoring force is adjusted to provide and maintain a force of constant intensity during grooving. The axial alignment and point loading between the scoring means and the roller is designed to provide scoring of a sheet material regardless of contour and internal stress patterns. Forces of the scoring means and roller are perpendicular to the surface of the material being scored and no torque is developed because of the axial alignment.

The number of scoring positions may be varied, and is determined by the number of arm assemblies mounted on the main shaft support. The length of the upper arm and lower arm units may vary as shown in FIGURE 7, such as for continuous scoring. Continuously moving sheet material is scored by mounting the scoring devices at approximately right angles to the arm assemblies and directing the moving material across supports 126 and scoring the material in lines parallel to the direction of movement as shown by the arrow in FIGURE 7. A variety of shapes, such as rectangles and circles, may be scored by relatively positioning and moving the scoring means and the material. Any preset distance between arm assemblies, when combined with varying the angular drawing of the material from the axis of the arms, produces narrower strips of the material without repositioning the arm assemblies.

Although I have disclosed the now preferred embodiments of my invention, it will be apparent to those skilled in the art that the various changes and modifications may be made thereto without departing from the spirit and scope thereof as defined in the appended claims.

I claim:

1. An apparatus for multiply scoring microsheet glass material subjected to deleterious influences of interior stresses and varying contour which comprises, an adjustable roller portion attached to a lower arm providing point support to a sheet of glass material to be scored; a positionable scoring means in axial alignment with the point support of the roller portion and attached to an upper arm; a constant force, scoring wheel, adjusting screw; an adjustable counterbalance for counterbalancing the upper and lower arms; an air cylinder relatively opening and closing the upper and lower arms and bringing the scoring means and roller portion into axial alignment although separated by the glass material being scored; a main shaft support for the arms and respective appurtenances attached thereto to pivot around, support brackets for supporting the ends of the main shaft support; and ball bushings below support brackets moving along shaft portions providing relative motion as the glass is scored.

2. An improved apparatus as defined in claim 1 wherein the lower arm has an attached adjustable counterbalance and the upper arm has an attached counterbalance, the air cylinder extends between the adjustable counterbalances and external to the upper and lower arms, and one of the shaft portions is mounted in a floating manner.

3. An improved apparatus as defined in claim 1 wherein the adjustable counterbalance is attached to the lower arm, and the air cylinder internally extends between the upper and the lower arms.

4. Apparatus as defined in claim 1 wherein the adjustable counterbalance is attached externally to the lower arm and the air cylinder externally extends between an upper arm counterweight rod and a lower arm counterweight rod.

5. An apparatus as defined in claim 1 wherein an adjustable counterbalance is attached externally to an upper arm counterweight rod and the air cylinder is externally mounted between the upper arm counterweight rod and the lower arm counterweight rod.

6. A scoring apparatus for microsheet glass material subject to deleterious influences, such as interior stresses, edge beads and varying contour which comprises, a plurality of support bars maintaining substantially rectangular track portions in a parallel relationship at the ends of the support bars; vertical support portions mounted to the upper surface of one track with platforms in open communication, supporting the ends of a floating shaft portion, vertical keeper portions mounted on the upper surface of the other track portion engaging the ends of a fixed shaft; ball bushings movably mounted on the fixed and floating shafts; support brackets mounted on the ball bushings; a main shaft support extending between upper triangular portions of the support brackets; an upper arm with a bifurcated portion on one end relatively engaged by a tongue on a generally L-shaped lower arm and both penetrated as a unit by the main shaft support; an omni-directionally mounted, point support producing, roller portion mounted at the outer end of the lower arm; an omni-directionally mounted, axially aligned, scoring means mounted at the outer end of the upper arm coincident to and in axial alignment with point support of the roller; adjustable counterweights mounted exteriorly to the upper and lower arms; and an air cylinder relatively opening and closing the lower and upper arms extending between the exterior, adjustable counterweights.

7. A method of scoring microsheet material which comprises:
   inserting the material between a rollable support and a supported scoring means;
   moving the material forward above such rollable support;
   providing lineal support to one surface of the moving material at right angles to the movement;
   scoring the material in a line parallel to the movement of the material and in direct vertical alignment with said lineal support; and
   counterbalancing the supports to prevent weight therefrom from inducing stresses into the material.

8. A method of continually scoring varyingly contoured internally stressed sheet material comprising:
   continuously moving sheet material between a support and a scoring means;
   linearly supporting a portion of one surface of the moving sheet material in a line perpendicular to a direction of movement of the material;
   providing a scoring force of constant intensity to the opposite surface of the moving sheet and perpendicularly of the lineal support;
   continually scoring the material in perpendicular alignment with the lineal support and parallel alignment with the direction of the movement of the material; and
   counterbalancing the support and scoring means to prevent stresses therefrom from being induced into the sheet during scoring.

9. A scoring apparatus comprising:
  support means for providing lineal support to a surface of a sheet material;
  scoring means positioned in alignment with said support means so that a scoring force exerted therebetween is perpendicularly aligned with said lineal support and the surfaces of the sheet material;
  a lower arm attached to the support portion;
  an upper arm attached to the scoring means;
  means for maintaining a constant pressure on the scoring means while scoring the sheet material; and
  a shaft support pivotally supporting the upper and lower arms about a common axis.

10. A scoring apparatus as defined in claim 9 including a counterweight counterbalancing at least one of the arms for removing the weight of said arm from the material being scored.

References Cited by the Examiner

UNITED STATES PATENTS

| | | | |
|---|---|---|---|
| 1,324,219 | 12/1919 | Waterloo | 225—96.5 |
| 1,341,262 | 5/1920 | Colburn | 225—96.5 X |
| 1,930,582 | 10/1933 | Burdett et al. | 225—96.5 |
| 2,254,413 | 9/1941 | Battershell | 83—12 X |
| 2,513,876 | 7/1950 | Judd | 225—96.5 |
| 2,529,210 | 11/1950 | Butler | 83—11 |
| 3,027,646 | 4/1962 | Brichard et al. | 225—96.5 X |
| 3,165,951 | 1/1965 | Lindquist | 83—12 |

FOREIGN PATENTS

| | | |
|---|---|---|
| 1,315,591 | 12/1962 | France. |
| 1,069,350 | 11/1959 | Germany. |

WILLIAM W. DYER, Jr., *Primary Examiner.*

ANDREW R. JUHASZ, *Examiner.*